United States Patent
Russell et al.

(10) Patent No.: US 12,242,105 B2
(45) Date of Patent: *Mar. 4, 2025

(54) HOLLOW-CORE FIBRE AND METHOD OF MANUFACTURING THEREOF

(71) Applicant: Max-Planck-Gesellschaft zur Förderung der Wissenschaften e.V., Munich (DE)

(72) Inventors: Philip Russell, Roettenbach (DE); Patrick Uebel, Marloffstein (DE); Michael Henoch Frosz, Erlangen (DE)

(73) Assignee: Max-Planck-Gesellschaft Zur Förderung der Wissenschaften e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,051

(22) Filed: Jun. 29, 2023

(65) Prior Publication Data

US 2023/0358948 A1 Nov. 9, 2023

Related U.S. Application Data

(63) Continuation of application No. 17/583,290, filed on Jan. 25, 2022, now Pat. No. 11,733,451, which is a (Continued)

(30) Foreign Application Priority Data

Aug. 26, 2015 (EP) ..................................... 15002534

(51) Int. Cl.
G02B 6/02 (2006.01)
G02B 6/024 (2006.01)
(Continued)

(52) U.S. Cl.
CPC ..... *G02B 6/02328* (2013.01); *G02B 6/02342* (2013.01); *G02B 6/02357* (2013.01);
(Continued)

(58) Field of Classification Search
None
See application file for complete search history.

(56) References Cited

U.S. PATENT DOCUMENTS

| 4,871,230 A | 10/1989 | Yamashita et al. |
| 6,437,422 B1 | 8/2002 | Solomon et al. |

(Continued)

FOREIGN PATENT DOCUMENTS

| CN | 1610978 A | 4/2005 |
| CN | 1938619 A | 3/2007 |

(Continued)

OTHER PUBLICATIONS

European Search Report for corresponding European Patent Application No. EP15002534 dated Nov. 3, 2015.
(Continued)

*Primary Examiner* — Chris H Chu
(74) *Attorney, Agent, or Firm* — Sterne, Kessler, Goldstein & Fox P.L.L.C.

(57) ABSTRACT

A hollow-core anti-resonant-reflecting fibre (HC-AF) includes a hollow-core region, an inner cladding region, and an outer cladding region. The hollow-core region axially extends along the HC-AF. The inner cladding region includes a plurality of anti-resonant elements (AREs) and surrounds the hollow-core region. The outer cladding region surrounds the inner cladding region. The hollow-core region and the plurality of AREs are configured to provide phase matching of higher order hollow-core modes and ARE modes in a broadband wavelength range.

19 Claims, 5 Drawing Sheets

Related U.S. Application Data continuation of application No. 16/502,980, filed on Jul. 3, 2019, now Pat. No. 11,269,135, which is a continuation of application No. 15/754,821, filed as application No. PCT/EP2016/001424 on Aug. 24, 2016, now Pat. No. 10,393,956.

(51) Int. Cl.
  *G02F 1/35* (2006.01)
  *G02F 1/365* (2006.01)

(52) U.S. Cl.
  CPC ..... *G02B 6/02361* (2013.01); *G02B 6/02366* (2013.01); *G02B 6/02371* (2013.01); *G02B 6/024* (2013.01); *G02F 1/3544* (2013.01); *G02F 1/365* (2013.01)

(56) References Cited

U.S. PATENT DOCUMENTS

| | | | |
|---|---|---|---|
| 6,847,771 | B2 | 1/2005 | Fajardo et al. |
| 7,346,249 | B2 | 3/2008 | Russell et al. |
| 7,627,220 | B2 | 12/2009 | Provost et al. |
| 7,693,369 | B2 | 4/2010 | Fan et al. |
| 7,733,497 | B2 | 6/2010 | Yun et al. |
| 7,899,294 | B2 | 3/2011 | Chen et al. |
| 8,094,986 | B2 | 1/2012 | Tanaka et al. |
| 8,159,742 | B2 | 4/2012 | Dong et al. |
| 8,306,379 | B2 * | 11/2012 | Benabid ............ C03B 37/02781 385/125 |
| 8,625,949 | B2 | 1/2014 | Lee et al. |
| 8,903,214 | B2 | 12/2014 | Alkeskjold |
| 9,977,180 | B2 | 5/2018 | Hoppe et al. |
| 10,139,560 | B2 | 11/2018 | Poletti et al. |
| 10,393,956 | B2 | 8/2019 | Russell et al. |
| 11,269,135 | B2 | 3/2022 | Russell et al. |
| 2003/0056550 | A1 | 3/2003 | Tanaka et al. |
| 2003/0231846 | A1 | 12/2003 | Fajardo et al. |
| 2005/0157998 | A1 * | 7/2005 | Dong .................. G02B 6/02047 385/127 |
| 2005/0185908 | A1 * | 8/2005 | Roberts ................. C03B 37/016 385/125 |
| 2005/0226578 | A1 * | 10/2005 | Mangan ............. G02B 6/02347 385/125 |
| 2005/0276556 | A1 * | 12/2005 | Williams ............ C03B 37/0122 385/123 |
| 2006/0263024 | A1 * | 11/2006 | Dong ........................ G02B 6/32 385/127 |
| 2011/0188825 | A1 * | 8/2011 | Alkeskjold ...... B29D 11/00663 264/1.24 |
| 2011/0267612 | A1 * | 11/2011 | Roberts .............. G02B 6/02328 385/124 |
| 2013/0022060 | A1 * | 1/2013 | Gaborel ............... G02B 6/4296 372/6 |
| 2013/0114129 | A1 | 5/2013 | Alkeskjold |
| 2015/0104131 | A1 | 4/2015 | Fini et al. |
| 2017/0160467 | A1 | 6/2017 | Poletti et al. |
| 2018/0267235 | A1 | 9/2018 | Russell et al. |
| 2019/0377131 | A1 | 12/2019 | Russell et al. |
| 2020/0103587 | A1 * | 4/2020 | Lyngsøe ............. C03B 37/0122 |

FOREIGN PATENT DOCUMENTS

| | | |
|---|---|---|
| CN | 101809475 | 8/2010 |
| CN | 102132178 A | 7/2011 |
| CN | 103278883 A | 9/2013 |
| CN | 106575012 A | 4/2017 |
| DE | 102008057278 A1 | 5/2009 |
| DE | 102015001990 A1 | 8/2015 |
| EP | 0 061 901 A1 | 10/1982 |
| EP | 0 255 848 A1 | 2/1988 |
| GB | 2526879 A | 12/2015 |
| JP | 2002-211941 A | 7/2002 |
| JP | 2005-538029 A | 12/2005 |
| JP | 2013-535032 A | 9/2013 |
| JP | 2017-520804 A | 7/2017 |
| KR | 10-2005-0004300 | 1/2005 |
| TW | 200515009 A | 5/2005 |
| TW | 201319627 A | 5/2013 |
| WO | WO 2004/001465 A1 | 12/2003 |
| WO | WO 2004/083918 A1 | 9/2004 |
| WO | WO 2015/185761 A1 | 12/2015 |

OTHER PUBLICATIONS

International Search Report for corresponding PCT Application No. PCT/EP2016/001424 dated Nov. 29, 2016.

Belardi et al., "Hollow Antiresonant Fibers With Low Bending Loss", Optics Express, vol. 22, No. 8, Apr. 21, 2014, pp. 10091-10096.

Belardi, W., "New Possibilities With Hollow Core Antiresonant Fibers", Optoelectronics Research Centre, University of Southampton, 2015, 6 pages.

Birks et al., "Endlessly Single-Mode Photonic Crystal Fiber", Optics Letters, vol. 22, No. 13, Jul. 1, 1997, pp. 961-963.

Couny et al., "Large-Pitch Kagome-Structured Hollow-Core Photonic Crystal Fiber", Optics Letters, vol. 31, No. 24, Dec. 15, 2006, pp. 3574-3576.

Debord et al., "Ultra Low-Loss Hypocycloid-Core Kagome Hollow-Core Photonic Crystal Fiber for Green Spectral-Range Applications", Optics Letters, vol. 39, No. 21, Nov. 1, 2014, pp. 6245-6248.

Euser et al., "Dynamic Control of Higher-Order Modes in Hollow-Core Photonic Crystal Fibers", Optics Express, vol. 16, No. 22, Oct. 27, 2008, pp. 17972-17981.

Fini et al., "Low-Loss Hollow-Core Fibers With Improved Single-Modedness", Optics Express, vol. 21, No. 5, Mar. 11, 2013, pp. 6233-6242.

Fini et al., "Polariztion Maintaining Single-Mode Low-Loss Hollow-Core Fibres", Nature Communications, vol. 5, No. 5085, Oct. 28, 2014, 7 pages.

Hartung et al., "Low-Loss Single-Mode Guidance in Large-Core Antiresonant Hollow-Core Fibers", Optics Letters, vol. 40, No. 14, Jul. 15, 2015, pp. 3432-3435.

Hartung et al., "Double Antiresonant Hollow Core Fiber-Guidance in the Deep Ultra Violet by Modified Tunneling Leaky Modes", Optics Express, vol. 22, No. 16, Aug. 11, 2014, pp. 19131-19140.

Jaworski et al., "High Energy Green Nanosecond and Picosecond Pulse Delivery Through a Negative Curvature Fiber or Precision Micro-Machining", Optics Express, vol. 23, No. 7, Apr. 6, 2015, pp. 8498-8506.

Lyngso et al., "Truly Single-Mode Polarization Maintaining Hollow Core PCF", Proc. of SPIE, vol. 8421, 2012.

Marcatili et al., "Hollow Metallic and Dielectric Wave-Guides for Long Distance Optical Transmission and Lasers", The Bell System Technical Journal, Jul. 1964, pp. 1783-1809.

Mortensen et al., "Modal Cutoff and the V Parameter in Photonic Crystal Fibers", Optics Letters, vol. 28, No. 20, Oct. 15, 2003, pp. 1879-1881.

Poletti, F., "Nested Antiresonant Nodeless Hollow Core Fiber", Optics Express, vol. 22, No. 20, Oct. 6, 2014, pp. 23807-23828.

Roberts et al., "Low Loss and Highly Birefringent Hollow-Core Photonic Crystal Fiber", 2006 European Conference on Optical Communications Proceedings, 2006.

Roberts et al. "Ultimate Low Loss of Hollow-Core Photonic Crystal Fibres", Optics Express, vol. 13, No. 1, Jan. 10, 2005, pp. 236-244.

Wei et al., "Higher-Order Mode Suppression in Chalcogenide Negative Curvature Fibers", Optics Express, vol. 23, No. 13, Jun. 29, 2015, pp. 15824-15832.

Non-Final Rejection directed to related U.S. Appl. No. 15/754,821, mailed Sep. 10, 2018; 10 pages.

Notice of Allowance directed to related U.S. Appl. No. 15/754,821, mailed Apr. 30, 2019; 7 pages.

International Preliminary Report on Patentability and Written Opinion of the International Searching Authority directed to related International Patent Application No. PCT/EP2016/001424, issued Feb. 27, 2018; 9 pages.

(56) References Cited

OTHER PUBLICATIONS

Kolyadin et al., "Light transmission in negative curvature hollow core fiber in extremely high material loss region", Optics Express, vol. 21, Issue 8, pp. 9514-9519, Apr. 10, 2013.
Non-Final Rejection directed to related U.S. Appl. No. 16/502,980, mailed Jun. 1, 2020; 8 pages.
Non-Final Rejection directed to related U.S. Appl. No. 16/502,980, mailed May 25, 2021; 9 pages.
Final Rejection directed to related U.S. Appl. No. 16/502,980, mailed Dec. 4, 2020; 9 pages.
Notice of Allowance directed to related U.S. Appl. No. 16/502,980, mailed Dec. 4, 2020; 9 pages.

* cited by examiner

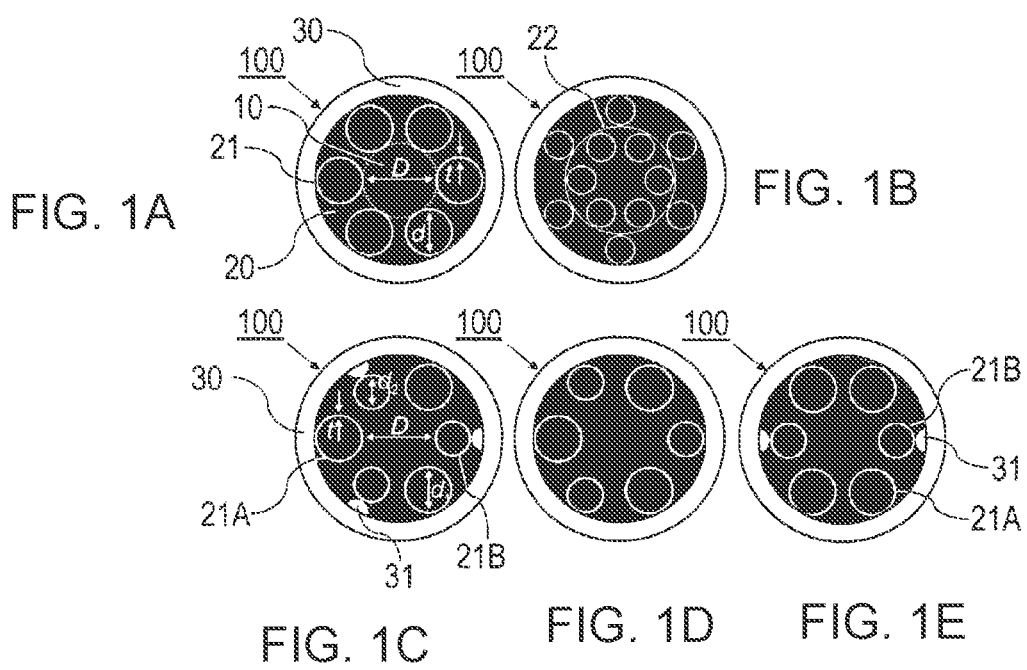

FIG. 2A
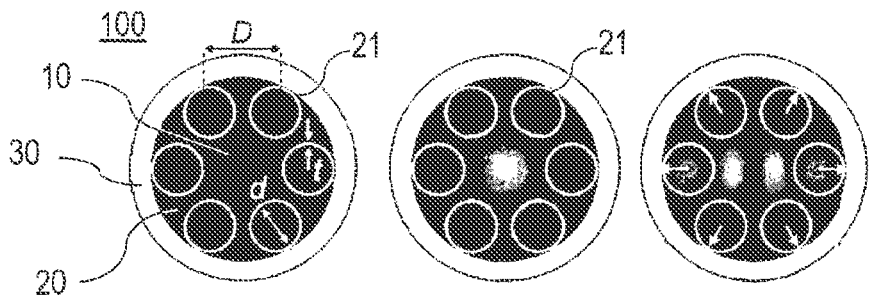
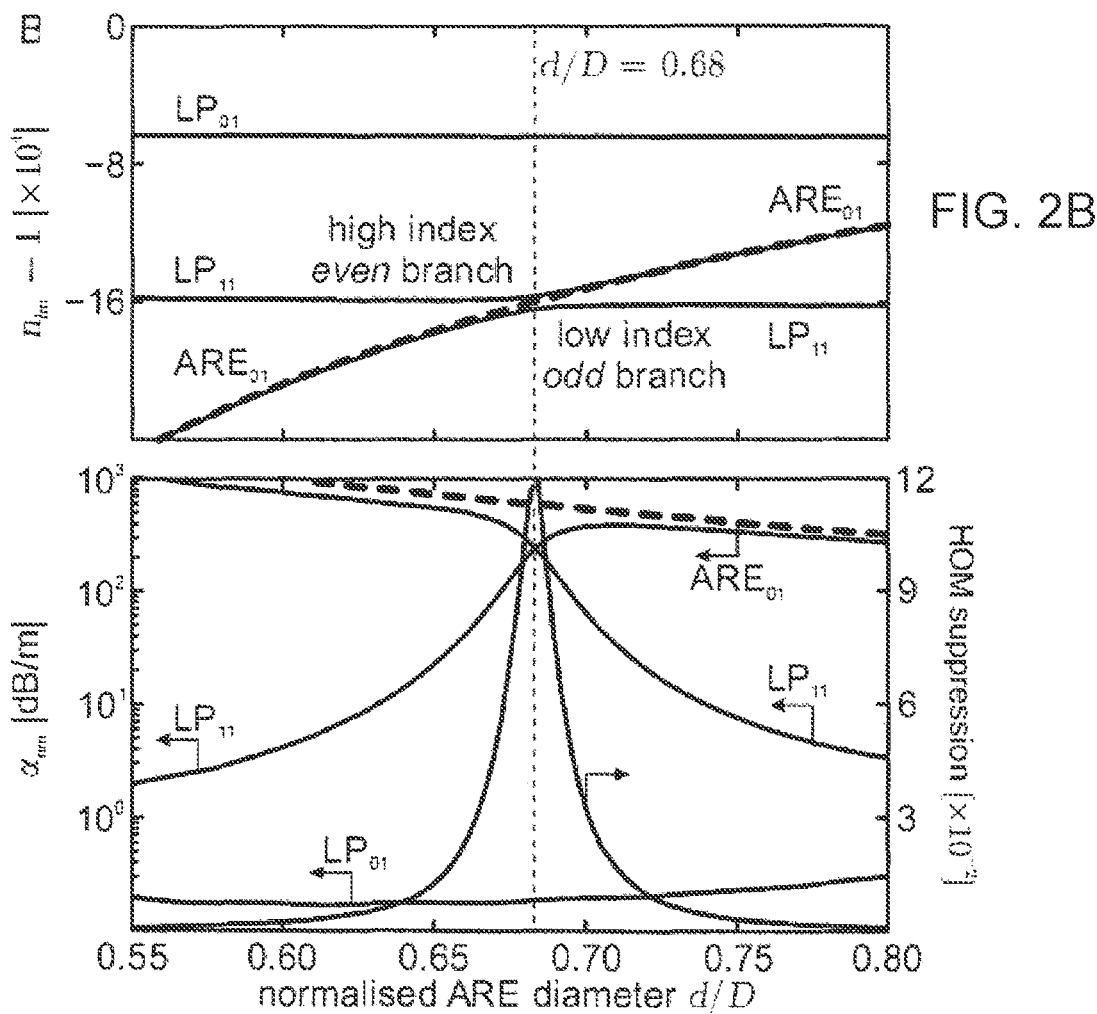
FIG. 2B
FIG. 2C

FIG. 4A
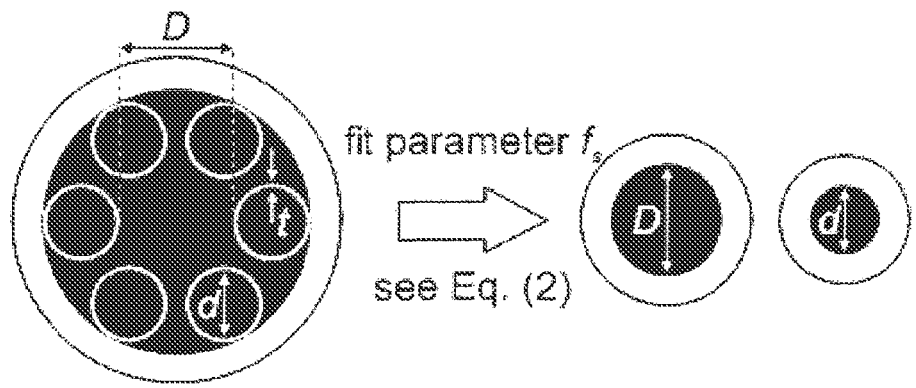
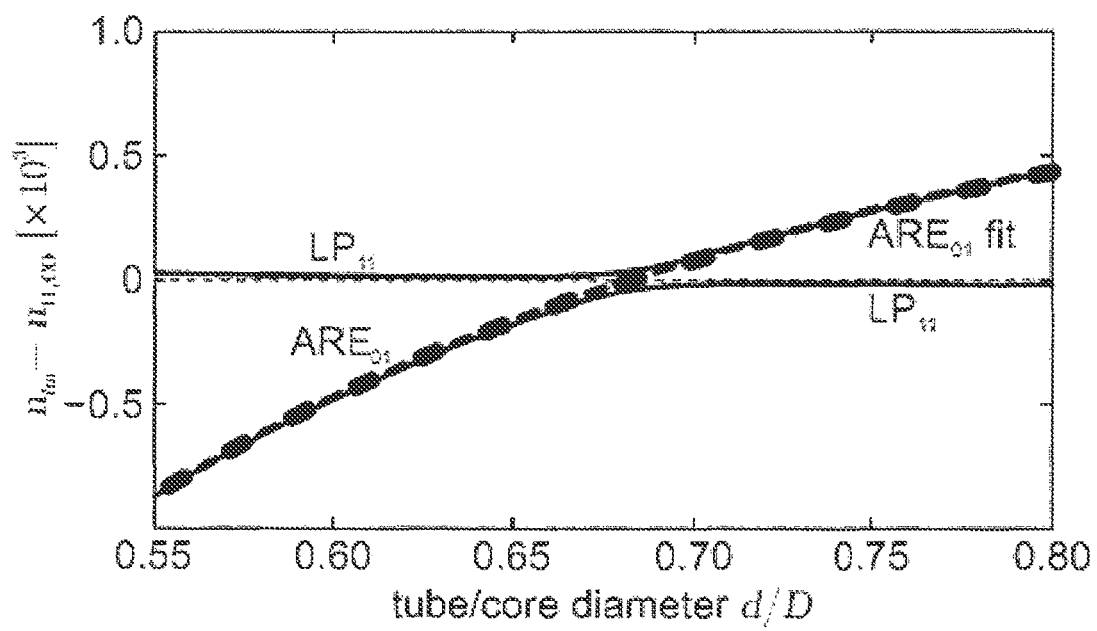
FIG. 4B

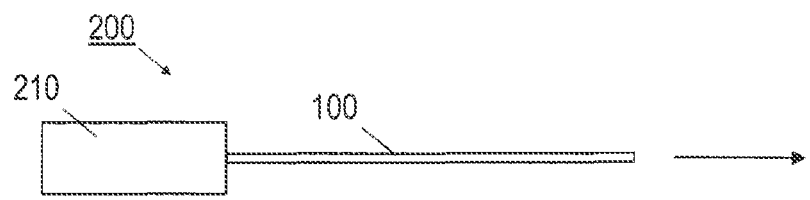
FIG. 5
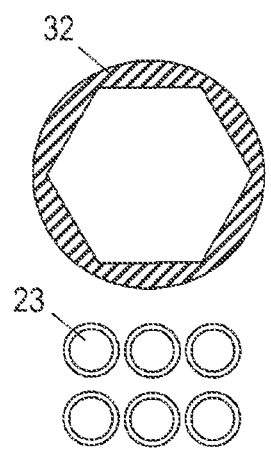
FIG. 6A
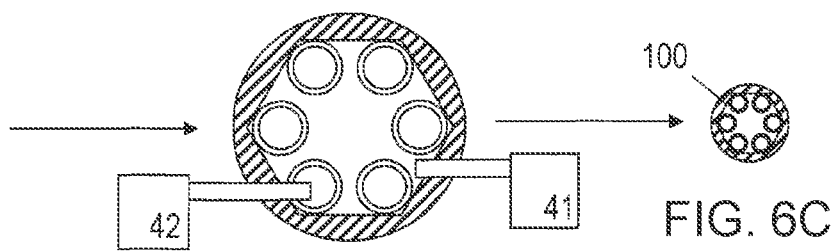
FIG. 6B
FIG. 6C
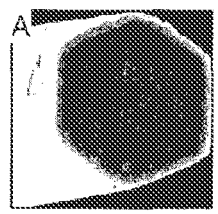
FIG. 7A
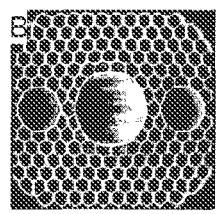
FIG. 7B
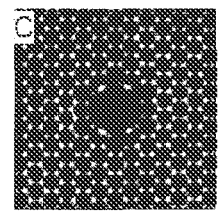
FIG. 7C
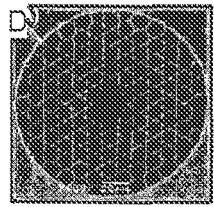
FIG. 7D
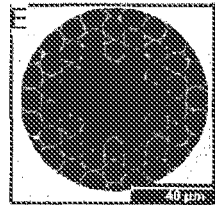
FIG. 7E
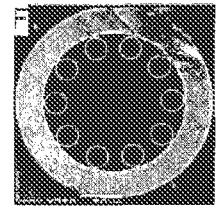
FIG. 7F
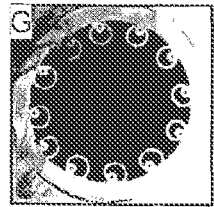
FIG. 7G
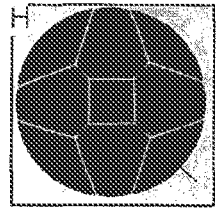
FIG. 7H
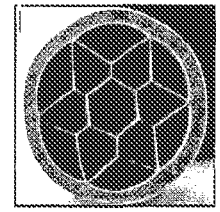
FIG. 7I

HOLLOW-CORE FIBRE AND METHOD OF MANUFACTURING THEREOF

CROSS REFERENCE TO RELATED APPLICATIONS

This application is a continuation of U.S. patent application Ser. No. 17/583,290, filed Jan. 25, 2022, which is a continuation of U.S. patent application Ser. No. 16/502,980, filed Jul. 3, 2019 (now U.S. Pat. No. 11,269,135, issued Mar. 8, 2022), which is a continuation of U.S. patent application Ser. No. 15/754,821, filed Feb. 23, 2018 (now U.S. Pat. No. 10,393,956, issued Aug. 27, 2019), which is a U.S. National Stage Entry of International Application No. PCT/EP2016/001424, filed Aug. 24, 2016, which claims priority to European Application No. 15002534.4, filed Aug. 26, 2015, which are hereby incorporated herein in their entireties by reference.

BACKGROUND

The disclosure relates to a hollow-core fibre (HCF, or: hollow-core photonic crystal fibre, HC-PCF) of non-bandgap type (or: hollow-core anti-resonant-reflecting fibre, HC-AF), in particular having an axial hollow core region and an inner cladding region comprising an arrangement of anti-resonant elements (AREs) surrounding the core region. Furthermore, the disclosure relates to an optical device including at least one HC-AF and to a method of manufacturing an HCF of non-bandgap type. Applications of the disclosure are available in the fields of data transmission, in particular low-latency data transmission, high-power beam delivery systems, in particular for material processing, modal filtering, gas-based nonlinear optics, in particular supercontinuum generation from the ultraviolet to the infrared or generation of ultrashort pulses, fibre gyroscopes or chemical sensing.

In the present specification, reference is made to the following, illustrating the technical background of light-guiding fibres, in particular HCF's of bandgap or non-bandgap type:

[1] T. A. Birks et al. in "Optics Letters" 1997. 22(13): p. 961-963;
[2] N. A. Mortensen et al. in "Optics Letters" 2003. 28(20): p. 1879-1881;
[3] US 2015/0104131 A1;
[4] P. J Roberts et al. in "Optics Express" 2005. 13(1): p. 236-244;
[5] J. K. Lyngso et al. in "22nd International Conference on Optical Fiber Sensors" Pts 1-3, 2012. 8421;
[6] J. M. Fini et al. in "Nature Communications" 2014. 5: article number 5085;
[7] F. Couny et al. in "Optics Letters" 2006. 31(24): p. 3574-3576;
[8] B. Debord et al. in "Optics Letters" 2014. 39(21): p. 6245-6248;
[9] W. Belardi et al. in "Optics Express" 2014. 22(8): p. 10091-10096;
[10] W. Belardi et al. in "arXiv: 1501.00586v2" 2015: p. [physics.optics];
[11] P. Jaworski et al. in "Optics Express" 2015. 23(7): p. 8498-8506;
[12] A. Hartung et al. in "Optics Express" 2014. 22(16);
[13] Benabid, A. F., et al., Hollow-core photonic crystal fibre, in U.S. Pat. No. 8,306,379 B2, GLOphotonics SAS;
[14] F. Poletti in "Optics Express" 2014. 22(20): p. 23807-23828;
[15] T. G. Euser et al. in "Optics Express" 2008. 16(22): p. 17972-17981;
[16] E. A. J. Marcatili et al. in "Bell Systems Technical Journal" 1964. 43: p. 1783-1809;
[17] J. M. Fini et al. in "Optics Express" 2013. 21(5): p. 6233-6242;
[18] C. Wei et al. in "Optics Express" 2015. 23: p. 15824; and
[19] A. Hartung et al. in "Optics Letters" 2015. 40(14): p. 3432.

Solid-core fibres are generally known and broadly used e.g. in data communication applications. Solid-core fibres can be designed for low-loss, single-mode transmission in a broadband transmission range of the fibre material, like quartz glass. So-called endlessly single-mode guidance (ESM, i.e. all higher order modes, HOMs, are leaky while the fundamental $LP_{01}$ mode is fully confined) is achieved in solid-core photonic crystal fibres (PCFs) by engineering a cladding structure surrounding the solid-core, as shown in FIG. 7A, such that the diameter d of channels in the cladding structure and their centre-centre spacing (pitch) $\Lambda$ fulfils the geometrical condition $d/\Lambda<0.41$ ([1, 2]). However, due to light guiding in the solid fibre material, disadvantages exist in terms of increased latency in data transmission, optically non-linear effects resulting in new light frequencies, and relatively low damage thresholds.

Through their ability to guide light in a non-solid core region, which is evacuated (vacuum core), filled with a gas or filled with a liquid, hollow-core photonic crystal fibres, HC-PCFs, have unique advantages compared to solid-core fibres, resulting in application areas such as low-latency data transmission, high-power beam delivery, gas-based nonlinear optics, light guiding with ultralow nonlinearities and chemical sensing. HC-PCFs are typically divided into two classes depending on the physical guidance mechanism: hollow-core photonic bandgap fibres (HC-PBFs) and hollow-core anti-resonant-reflecting fibres (HC-AF s).

FIGS. 7B to 7I show a selection of scanning electron micrographs of different types of conventional HC-PCFs. FIGS. 7B and 7C show HC-PBFs that confine modes inside a central hollow core by means of a photonic bandgap in the cladding [4-6]. These types of PCF typically have relatively low loss (ca. <20 dB/km) at telecommunication wavelengths. However, due to the wavelength-specific effect of the photonic bandgap, they guide light over a relatively narrow bandwidth (ca. <15 THz) only. Although in general HC-PBFs support HOMs, Fini et al. ([6], [3]) have shown that bended HC-PBFs can be made effectively single-mode by including "satellite" hollow cores in the cladding (FIG. 7B). These satellites strongly suppress HOMs in the core by phase-matching to them, causing high HOM loss. HC-PBGs can also be made truly single-mode over a narrow spectral range (ca. <7 THz) if a small enough core is used (see FIG. 7C) [5], but this results in fabrication difficulties and significantly higher loss for the desired fundamental mode.

FIGS. 7D to 7I show a selection of HC-AF structures, i.e. fibres having guidance mechanism based mostly on anti-resonant effects. FIGS. 7D and 7E have a Kagomé-lattice cladding [7, 8, 13] and FIGS. 7F and 7G have one ring of single (F) or nested (G) anti-resonant elements (AREs). FIG. 7H shows an HC-AF with a square core [12] and FIG. 7I depicts an HC-AF with guiding properties in the ultraviolet [19]. Compared to HC-PBFs, the loss of HC-AFs is in general larger because of the non-ideal confinement, but the transmission window is broader.

F. Poletti showed numerically that by engineering the radial distance between nested AREs, an HC-AF can be made effectively single-mode over a limited wavelength range [14], but this has not been demonstrated experimentally. In particular, mode suppression has been suggested in [14] for a certain centre wavelength and a certain structural parameter z/R only, wherein z is a diameter difference of AREs and nested structures in the AREs and R is the radius of the hollow core. This theoretical finding cannot be extended to a general design and manufacturing of HC-AFs.

Also Wei et al. ([18]) and A. Hartung et al. ([19]) showed that HOM suppression can be enhanced. This was achieved in HC-AFs with touching AREs, but the overall HOM suppression was relatively low. According to [18], the effect of varying the thickness t of the touching AREs on the effective refractive index of the hollow core and the AREs has been investigated. An optimum thickness has been found wherein HOMs are suppressed. As a disadvantage of this approach, HOM suppression has been shown for a certain wavelength only, but not for a broad wavelength range.

Compared to solid-core fibres, one particular drawback of conventional HC-AFs is their inability to be purely single-mode, i.e. higher order modes (HOMs) are supported for relatively long distances. As a consequence the output beam quality is degraded, which is undesirable in many applications as it introduces modal beating, blurring the focal spot and—if the fibre experiences change in stress—causes power fluctuations. Another disadvantage of conventional HC-AFs results from limitation in manufacturing thereof, in particular positioning the AREs at specific azimuthal locations in a sufficient stable and reproducible manner.

The objective of the disclosure is to provide an improved hollow-core fibre of non-bandgap type, which is capable of avoiding disadvantages of conventional HC-AFs. In particular, the HC-AF is to be provided with an extended wavelength range of single-mode transmission, increased loss of HOMs, and/or increased ratio in loss between the highest-index core HOM and the fundamental, e. g. $LP_{01}$ mode. Furthermore, the objective of the disclosure is to provide an improved optical device being equipped with at least one HC-AF and avoiding limitations of conventional optical devices, in particular in terms of low loss single mode guidance, damage-free high power light delivery and targeted creation of optically nonlinear effects. Furthermore, the objective of the disclosure is to provide an improved method of manufacturing a hollow-core fibre of non-bandgap type resulting in the improved inventive HC-AF and avoiding limitations of conventional manufacturing methods.

These objectives are solved with a hollow-core fibre of non-bandgap type, an optical device and a method of manufacturing a hollow-core fibre of non-bandgap type, comprising the features of the independent claims, resp. Advantageous embodiments and applications of the disclosure are defined in the dependent claims.

BRIEF SUMMARY

In some embodiments, a hollow-core anti-resonant-reflecting fibre (HC-AF) includes a hollow-core region, an inner cladding region, and an outer cladding region. The hollow-core region axially extends along the HC-AF. The inner cladding region includes a plurality of anti-resonant elements (AREs) and surrounds the hollow-core region. The outer cladding region surrounds the inner cladding region. The hollow-core region and the plurality of AREs are configured to provide phase matching of higher order hollow-core modes and ARE modes in a broadband wavelength range.

In some embodiments, the hollow-core region and the plurality of AREs are further configured to provide effectively endlessly single-mode (eESM) behavior. In some embodiments, the hollow-core region and the plurality of AREs are further configured to provide at least a frequency of 10 THz in the broadband wavelength range. In some embodiments, the hollow-core region and the plurality of AREs are further configured to provide at least a frequency of 20 THz in the broadband wavelength range. In some embodiments, the hollow-core region and the plurality of AREs are further configured to provide all wavelengths within a hollow-core transparency window of a transverse fundamental hollow-core mode.

In some embodiments, the refractive indices of the hollow-core region and the plurality of AREs are equal. In some embodiments, each of the plurality of AREs includes an elliptical transverse cross-section. In some embodiments, each of the plurality of AREs includes a circular transverse cross-section. In some embodiments, the HC-AF further includes a plurality of longitudinal protrusions disposed between the inner cladding region and the outer cladding region.

In some embodiments, the plurality of AREs includes a first plurality of AREs and a second plurality of AREs. In some embodiments, each of the first plurality of AREs has at least one physical characteristic that is different than each of the second plurality of AREs.

In some embodiments, the plurality of AREs includes a first plurality of AREs and a second plurality of AREs, each of the first plurality of AREs includes a first transverse cross-sectional dimension ($d_1$), each of the second plurality of AREs includes a second transverse cross-sectional dimension ($d_2$), and the second transverse cross-sectional dimension ($d_2$) is no greater than the first transverse cross-sectional dimension ($d_1$). In some embodiments, the HC-AF further includes a support tube disposed between the first plurality of AREs and the second plurality of AREs.

In some embodiments, the hollow-core region includes a first transverse cross-sectional dimension (D), each of the plurality of AREs includes a second transverse cross-sectional dimension (d), and a ratio of the first and second transverse cross-sectional dimensions (d/D) is approximated to a quotient of zeros of Bessel functions of the first kind ($u_{lm,ARE}/u_{lm,core}$), multiplied with a fitting factor in a range of about 0.9 to about 1.5, with m being the m-th zero of the Bessel functions of the first kind of order l, the zeros of the Bessel functions describing linearly polarized (LPN) ARE modes and linearly polarized (LPN) higher order hollow-core modes, respectively.

In some embodiments, an optical device includes a hollow-core anti-resonant-reflecting fibre (HC-AF). The HC-AF includes a hollow-core region axially extending along the HC-AF, an inner cladding region comprising a plurality of anti-resonant elements (AREs) and surrounding the hollow-core region, and an outer cladding region surrounding the inner cladding region. In some embodiments, the hollow-core region includes a first transverse cross-sectional dimension (D) and each of the plurality of AREs includes a second transverse cross-sectional dimension (d). In some embodiments, the hollow-core region and the plurality of AREs are configured to provide phase matching of higher order hollow-core modes and ARE modes in a broadband wavelength range.

In some embodiments, a ratio of the first and second transverse cross-sectional dimensions (d/D) is configured to provide effectively endlessly single-mode (eESM) behavior. In some embodiments, a ratio of the first and second transverse cross-sectional dimensions (d/D) is configured to provide at least a frequency of 10 THz in the broadband wavelength range. In some embodiments, a ratio of the first and second transverse cross-sectional dimensions (d/D) is configured to provide all wavelengths within a hollow-core transparency window of a transverse fundamental hollow-core mode.

In some embodiments, a method of manufacturing a hollow-core anti-resonant-reflecting fibre (HC-AF) includes providing an inner cladding region comprising a plurality of anti-resonant elements (AREs) and an outer cladding region surrounding the inner cladding region. The method further includes coupling the plurality of AREs to an inner surface of the outer cladding region. The method further includes forming a hollow-core region axially extending along the HC-AF and surrounded by the inner cladding region. In some embodiments, the hollow-core region includes a first transverse cross-sectional dimension (D) and each of the plurality of AREs includes a second transverse cross-sectional dimension (d). In some embodiments, the hollow-core region and the AREs are configured to provide phase matching of higher order hollow-core modes and ARE modes in a broadband wavelength range.

In some embodiments, the forming includes forming a ratio of the first and second transverse cross-sectional dimensions (d/D) such that the broadband wavelength range covers at least a frequency of 10 THz. In some embodiments, the method further includes filling the HC-AF with a gas, a liquid, or a material having a non-linear optical response.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

FIGS. 1A-1E illustrate cross-sectional views of various HC-AFs, according to exemplary embodiments.

FIGS. 2A-2C illustrate coupling HOMs of a core region with ARE modes and numerical simulations varying d/D to find the optimum ratio between ARE dimension d and core dimension D, according to exemplary embodiments.

FIGS. 4A and 4B illustrate application of an inventive model for designing an HC-AF, according to exemplary embodiments.

FIG. 5 illustrates an optical device, according to exemplary embodiments.

FIGS. 6A-6C illustrate steps of a method of manufacturing an HC-AF, according to exemplary embodiments.

FIGS. 7A-7I illustrate cross-sectional views of various solid- and hollow-core fibres, according to exemplary embodiments.

Figures 3A, 3B:
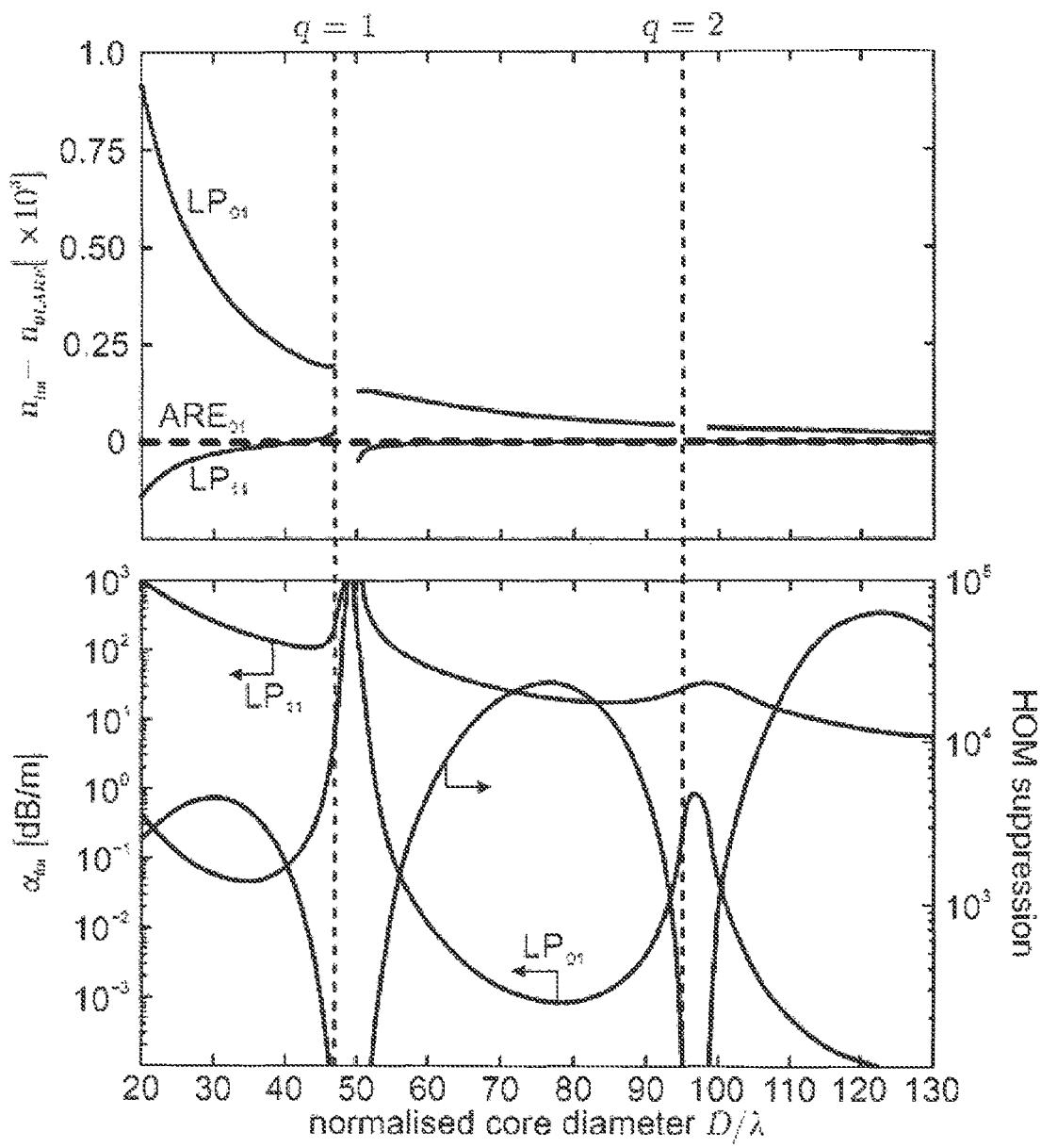
FIGS. 3A and 3B illustrate numerical simulations varying D/λ, to illustrate the scalability of various HC-AFs, according to exemplary embodiments.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this disclosure. The disclosed embodiment(s) merely exemplify the disclosure. The scope of the disclosure is not limited to the disclosed embodiment(s). The disclosure is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

According to a first general aspect of the disclosure, the above objective is solved by a hollow-core fibre of non-bandgap type, comprising a hollow core region axially arranged along the longitudinal extension of the hollow-core fibre and an inner cladding region comprising an arrangement of multiple anti-resonant elements, AREs, surrounding the core region along the length of the hollow-core fibre. The core region is adapted for guiding a transverse fundamental core mode and transverse higher order core modes of a light field coupled into the HC-AF. The core region has a smallest transverse core dimension (D), which is the smallest distance between AREs on diametrically opposite sides of the core region. Preferably, the smallest transverse core dimension is constant along the length of the HC-AF. Each of the AREs is adapted for guiding transverse ARE modes, and the i-th ARE has a smallest transverse ARE dimension ($d_i$). Preferably, the smallest transverse ARE dimension also is constant along the length of the HC-AF. The core region and the AREs are configured to provide phase matching of the higher-order core modes of the core region to the ARE modes of the AREs. In other words, the higher order core modes and the ARE modes have refractive indices which are equal or approximated to each other so that the higher-order core modes can resonantly couple to the ARE modes, i.e. the ARE modes can be excited by the higher-order core modes.

The hollow core region of the inventive HC-AF is formed by an inner space of the hollow-core fibre, which is empty (evacuated) or filled with a gas, in particular at least one of air, noble gas and hydrogen, a liquid, and/or a material having a non-linear optical response, like e.g. at least one of the above gases or a Rydberg gas. Accordingly, the term "hollow core region" covers any longitudinal waveguide structure which is free of solid materials in its inner space. The core region has a first refractive index determined by the material thereof, while the refractive (or effective) index of the core mode is determined by the material refractive index, the shape of the core region and the excitation wavelength.

In radial directions, the core region is surrounded by the AREs, which are arranged in a non-touching manner. In other words, the inner cladding region comprises an arrangement of single AREs without an azimuthal contact thereof. The term "anti-resonant element", ARE (or: "tube" or "cladding capillary"), refers to any hollow wave-guiding element having a smaller diameter than the hollow core region and extending along the length of the HC-AF. Preferably, the wall thickness of the AREs of the inner cladding region is smaller than 20% of the core dimension D, e. g. <5 μm. All AREs can have the same smallest inner dimension, or each ARE can have a different smallest inner dimension. The inner cladding region surrounding the core region has a refractive index (a second refractive index) higher than the first refractive index of the core region. The hollow AREs are empty (evacuated) or filled like gas or liquid, e. g. like the core region.

An even number of AREs, e. g. 4 or 6, or an odd number of AREs, e. g. 3 or 5 or 7, is provided, which can be arranged with an even or odd numbered symmetry delimiting the core region. Preferably, the AREs are non-nested AREs, and/or the AREs are made of a glass, in particular silica, a plastic material, in particular polymer, composite, in particular ZBLAN fiber composite, metal or crystalline material. Preferably, for holding the AREs, an outer cladding region is provided, wherein the AREs are attached to an inner surface of the outer cladding region.

According to the disclosure, each of the ARE dimensions ($d_i$) and the core dimension (D) are selected such that a ratio of the ARE and core dimensions ($d_i/D$) is approximated to a quotient of zeros of Bessel functions of first kind ($u_{lm,ARE}/u_{lm,core}$), multiplied with a fitting factor in a range of 0.9 to 1.5, preferably 0.96 to 1.20, with m being the m-th zero of the Bessel function of first kind of order l, said zeros of the Bessel functions describing (modelling) the $LP_{lm}$ ARE modes and $LP_{lm}$ higher order core modes, respectively. Advantageously, the inventors have found a modal filtering effect depending on only one dimensionless geometrical parameter ($d_i/D$), akin to the well-known d/Λ parameter for endlessly single-mode solid-core PCF.

The inventors have found that modal refractive indices of the $LP_{lm}$ ARE modes and $LP_{lm}$ higher order core modes can be represented by an analytical model based on modes of coupled capillary waveguides, said modes being approximated by a Marcatili-Schmeltzer expression, which depends on the zeros of the Bessel function providing the modes and the fitting factor. Phase-matching the $LP_{lm}$ ARE modes and $LP_{lm}$ higher order core modes, i. e. matching the modal indices thereof can be obtained if the ratio of the ARE and core dimensions ($d_i/D$) is adapted to the quotient of zeros of Bessel functions of first kind ($u_{lm,ARE}/u_{lm,core}$), multiplied with the fitting factor.

Preferably, the fitting factor is a model parameter, which is obtained from matching the analytical model to a vectorial finite element (FE) modelling of the $LP_{lm}$ ARE modes and $LP_{lm}$ higher order core modes of the HC-AF. In particular, the fitting factor results from a division from a first factor matching the analytical model to the FE model of the $LP_{lm}$ higher order core modes and a second factor matching the analytical model to the FE model of the $LP_{lm}$ ARE modes, as further described below with reference to equation (4).

The terms "approximating" (or "adapting") include an equality of the ratio of the ARE and core dimensions and the quotient of zeros of Bessel functions of first kind, multiplied with the fitting factor, or a difference between the ratio of the ARE and core dimensions and the quotient of zeros of Bessel functions of first kind, multiplied with the fitting factor, being minimized such that a ratio in loss (dB/m) between the highest-index core HOM and the $LP_{01}$ core mode is >5, in particular >10 or even >25, preferably >50.

Advantageously, with the above condition for selecting the ratio of the ARE and core dimensions, the inventors have found a new design parameter for the HC-AFs allowing a broadband extension of the HOM coupling to ARE modes, e.g. up to all wavelengths within the transparency window of its fundamental core mode. According to the disclosure, refractive indices of the core region and the AREs are equal or approximated to each other in a broad wavelength range, preferably covering at least 10 THz, particularly preferred covering at least 20 THz.

All modes except the fundamental are strongly suppressed, resulting in effectively single-mode behaviour of the HC-AF (effectively endlessly single-mode behaviour, eESM). Contrary to (effectively) single-mode HC-PBFs [17], the proposed HC-AF structure provides a much larger bandwidth at relatively low loss while providing eESM behaviour. Furthermore, contrary to the HC-AF described in [18], wherein the thickness of the glass capillaries in the cladding has been optimized only, the disclosure provides the new design parameter for the ratio of the ARE and core dimensions. This new design provides real phase-matching, whereas in [18] phase-matching was not achieved (see FIG. 2a of [18]). Contrary to the SM guidance for HC-PBFs [6] where shunts have been included in the bandgap cladding to enhance HOM suppression for a relatively narrow wavelength range, the inventive HC-AF supports HOM suppression for an extended frequency range.

The ratio of the ARE and core dimensions is selected on the basis of a model which has been found by the inventors for describing tubular AREs (ARE capillaries) with a circular transverse cross-section as outlined below. In this case, the smallest transverse ARE dimension ($d_i$) is the inner diameter of the ARE. As a further advantage of the disclosure, the selected design parameter is valid not only for tubular AREs, but also for AREs having other cross-sections, like elliptical or even polygonal cross-sections. With the latter variants, the smallest transverse ARE dimension ($d_i$) is the smallest inner cross-sectional dimension of the ARE. The inventors have found that the model based on tubular AREs still provides an excellent approximation for HOM suppression in non-circular AREs, if they can be approximately modelled like a tubular ARE.

According to a preferred embodiment of the disclosure, the AREs have a first smallest transverse ARE dimension ($d_1$) and the ratio of the first smallest transverse ARE dimension and the core dimension ($d_1/D$) is approximated to a quotient of zeros of Bessel functions of first kind ($u_{01,ARE}/u_{11,core}$), multiplied with the fitting factor, said zeros ($u_{01,ARE}$), ($u_{11,core}$) describing the $LP_{01}$ ARE modes and the $LP_{11}$ core mode, respectively. Accordingly, the most pronounced HOM of the core region, the $LP_{11}$ core mode, is coupled to the ARE modes. With this embodiment, preferably all AREs have the same smallest transverse ARE dimension. As an example, all AREs are tubular AREs having the same inner diameter. According to particularly preferred variants of this embodiment, the ratio of the first ARE dimension and the core dimension ($d_1/D$) is selected in a range from 0.5 to 0.8, preferably from 0.60 to 0.75, in particular in a range from 0.62 to 0.74. Advantageously, an HC-AF is provided with these ranges, having low-loss guidance for the fundamental mode at all wavelengths within its transmission window, strongly suppressing the $LP_{11}$ core mode and also all higher-order modes.

According to a further advantageous embodiment of the disclosure, the AREs comprise a first group of AREs with the first ARE dimension ($d_1$) and a second group of AREs with a second smallest transverse ARE dimension ($d_2$) smaller than the first ARE dimension ($d_1$) of the first group of AREs. With this embodiment, the ratio of the second ARE dimension and the core dimension ($d_2/D$) is approximated to a quotient of zeros of Bessel functions of first kind ($u_{01,ARE}/u_{21,core}$), multiplied with the fitting factor, said Bessel functions ($u_{01,ARE}$), ($u_{21,core}$) describing the $LP_{01}$ ARE modes and the $LP_{21}$ core mode, respectively. AREs having the first ARE dimension and AREs having the second ARE dimension can be arranged in an alternating fashion, surrounding the hollow core region of the HC-AF.

According to particularly preferred variants of this embodiment, the ratio of the second ARE dimension and the core dimension ($d_2/D$) is selected in a range from 0.3 to 0.7, preferably from 0.43 to 0.59, in particular in a range from 0.45 to 0.54. Advantageously, an HC-AF is provided with these ranges, having a further improved suppression of the HOMs.

Advantageously, multiple variants are available for designing the arrangement of AREs, which provide the inner cladding region of the inventive HC-AF. These variants can be selected as alternatives or in combination in dependency on the particular application of the disclosure. Firstly, the arrangement of AREs can have a three-fold symmetry. Alternatively, the arrangement of AREs can have two-fold symmetry and causes optical birefringence. Furthermore, the AREs can be arranged such that the cross-sections thereof are distributed on a single ring surrounding the core region. Alternatively, the AREs can be arranged such that the cross-sections thereof are distributed on multiple, e. g. two, three or more, coaxial rings surrounding the core region. Advantageously, lower loss HC-AFs with improved HOMS suppression can be realized with these variants of the disclosure.

The outer cladding region for holding the AREs has the shape of a hollow sleeve extending along the HC-AF and having an inner surface for attaching the AREs and an outer surface which can be exposed as the surface of the HC-AF or covered with further layers, e.g. protective layers, like a polymer coating, or an opaque layer. According to a variant of the disclosure, the outer cladding region has an inner transverse cross-section with a regular polygonal shape, e.g. a hexagonal shape, and the AREs are fixed to corners of the polygonal shape. As an advantage, each ARE is fixed along two contact lines with the inner surface of the outer cladding region, thus increasing the mechanical stability of the inner cladding region (AREs) when preparing the preform. Furthermore, the AREs are fixed with a regular azimuthal spacing by arranging them in the corners of the polygonal shape. According to an alternative variant of the disclosure, the outer cladding region has an inner transverse cross-section with a curved, in particular circular shape, and the AREs are evenly distributed in the curved shape.

According to a second general aspect of the disclosure, the above objective is solved by an optical device, including at least one hollow-core fibre according to the above first general aspect of the disclosure. Preferably, the optical device comprises at least one of a modal filtering device, a light source, in particular a laser, an optical amplifier, a beam delivery system, a data communication system, a frequency converter, in particular for supercontinuum generation and a pulse shaper, in particular for pulse compression.

According to a third general aspect of the disclosure, the above objective is solved by a method of manufacturing a hollow-core fibre according to the above first general aspect of the disclosure. Preferably, the method of manufacturing a hollow-core fibre comprises the steps of providing ARE preforms and a hollow jacket preform, fixing the ARE preforms on an inner surface of the jacket preform in a distributed manner, and heating and drawing the jacket preform including the ARE preforms until the final ARE and core dimensions are set.

Optionally, the jacket preform including the ARE preforms are—in a first heating and drawing step—first drawn to a cane and—in a second heating and drawing step—then drawn to a fibre until the final ARE and core dimensions are set.

Preferably, the heating and drawing steps include applying a vacuum or an increased fluid pressure to at least one of the jacket preform and the ARE preforms for setting the ARE and core dimensions, respectively. Advantageously, this allows a precise adjustment of the smallest transverse core dimension (D) of the core region and the smallest transverse ARE dimension(s) ($d_i$) of the AREs.

According to a preferred embodiment of the disclosure, the ARE and core dimensions are selected, preferably set during the final heating and drawing step, such that the phase matching of the higher order core modes and the ARE modes is obtained over a frequency range above 20 THz. This can be achieved by theoretical considerations or reference measurements.

According to further advantageous embodiments of the disclosure, a post-processing step can be provided, wherein at least one of the core region and the anti-resonant elements can be filled with at least one of a gas, in particular air, noble gas and/or hydrogen, a liquid, and/or a material having a non-linear optical response. To this end, at least one portion of the hollow core fiber can be enclosed into a cell. The cell and all of the hollow core regions can be filled with a material from an external reservoir, or some of the hollow core regions can be filled with a material from a first external reservoir and some of another material of a second external reservoir. This post-processing step can be implemented just before or during the application of the fiber, e.g. in an optical experiment. Further post-processing steps can follow for adapting the inventive fibre to the application thereof, e.g. in data transmission or non-linear optics.

In the following, exemplary reference is made to choosing a proper geometry of the HC-AF, in particular the diameter of the core and AREs, like glass capillaries in the inner cladding region. Implementing the disclosure is not restricted to the indicated examples of geometric quantities, like the dimensions D, d and t, but rather possible with varied values providing the inventive design parameters.

Practical Examples of HC-AFs

FIGS. 1A to 1E show transverse cross-sections of practical examples of inventive HC-AFs 100 (perpendicular to the axial extension thereof). The bright circles represent the solid material of the AREs or outer cladding region, like quartz glass or silica, while the dark portions are free of solid materials (evacuated or filled with gas or liquid). The geometric design of the HC-AFs 100 is selected as outlined in the model section below.

Each HC-AF 100 comprises a hollow core region 10 (represented in FIG. 1A by a dotted circle), an inner cladding region 20 with multiple AREs 21, and an outer cladding region 30. The hollow core region 10 is the empty space, between the AREs 21, extending along the longitudinal length of the HC-AF 100 and having a smallest transverse core dimension D. The AREs 21 of the inner cladding region 20 comprise capillaries having a wall thickness t and a smallest transverse ARE dimension d. The AREs 21 are fixed to the inner surface of the outer cladding region 30, e.g. as described below with reference to FIG. 6. The outer cladding region 30 comprises a larger capillary being made of e.g. glass and providing a closed cladding of the HC-AF 100.

HC-AF 100 of FIG. 1A illustrates an embodiment wherein the AREs 21 comprise a single-ring of six thin-wall capillaries with a circular transverse cross-section (inner diameter d=13.6 μm and wall thickness t=0.2 μm) arranged within the larger capillary of the outer cladding region 30 in six-fold symmetric pattern so as to create a central hollow core of diameter D (the shortest distance between diametrically opposite AREs 21), with D=20 The outer cladding region 30 has an outer diameter of 125 μm and a cladding thickness of 38 μm. Alternatively, the core dimension D can be selected in a range from 10 μm to 1000 μm, wherein the other geometrical parameters (like d, t) are scaled accordingly.

FIG. 1B shows a modified embodiment with multiple capillaries, in particular two coaxial rings of AREs 21 (d=13.6 μm, t=0.2 μm, and D=20 μm) arranged within the outer cladding region 30 with six-fold symmetry. For holding the inner and outer rings of AREs 21, a support tube 22 can be included in the HC-AF 100. The support tube 22 is made of e.g. silica with a diameter of e.g. 48 μm.

FIGS. 1C and 1D illustrate a three-fold symmetry and FIG. 1E shows a two-fold symmetry of HC-AF 100, advantageously offering enhanced eESM effects.

According to FIG. 1C, the AREs 21A, 21B comprise a first group of AREs 21A with a first, larger ARE dimension $d_1$ (e.g. 13.6 μm) and a second group of AREs 21B with a second, smaller ARE dimension $d_2$ (e.g. 10.2 μm), both with a wall thickness of e.g. 0.2 μm. On the inner surface of the outer cladding 30, longitudinal protrusions 31 are provided, which have an axial extension along the HC-AF 100. In the cross-sectional view of FIG. 1C, the protrusions 31 are shown as blobs. Preferably, the protrusions 31 are made of the same material like the AREs, e.g. glass. Each of the smaller AREs 21B is fixed to the top of one of the protrusions 31. The AREs 21A, 21B surround the core region 10 having a diameter D=20 μm. The radial height of the protrusions 31 preferably is selected so as to yield the most circularly-symmetric guided mode in the central core region 10. Alternatively, the protrusions 31 could be omitted, yielding a simpler structure, as shown in FIG. 1D.

By arranging the AREs 21A, 21B so as to form a two-fold symmetric structure (FIG. 1E), a birefringent polarization-maintaining HC-AF is obtained, displaying eESM behavior.

The examples of inventive HC-AFs 100 as shown in FIG. 1 can be modified, in particular with regard to the shape of the AREs 21, 21A, 21B, which can have e.g. an elliptic or polygonal cross-section; the inner shape of the outer cladding 30, which can have e.g. a polygonal cross-section (see FIG. 6); the solid materials of the AREs 21, 21A, 21B, which may comprise e.g. plastic material, like PMMA, glass, like silica, or soft-glass, like ZBLAN; the dimensions of the AREs 21, 21A, 21B; the number of rings of AREs, e.g. three or more; the number of AREs, e.g. 4 or 5 or 7 or more; and the symmetry of the ARE arrangement.

Model for HC-AF Design

The ARE dimension ($d_i$) and the core dimension (D) of the inventive HC-AFs 100 are selected such that a ratio of the ARE and core dimensions ($d_i$/D) is approximated to a quotient of zeros of Bessel functions of first kind ($u_{lm,ARE}/u_{lm,core}$), multiplied with the fitting factor, as defined above. If all AREs have the same ARE dimension ($d_1$), the ratio of the ARE dimension and the core dimension ($d_1$/D) preferably is approximated to a quotient of zeros of Bessel functions of first kind ($u_{01,ARE}/u_{11,core}$), multiplied with the fitting factor, wherein the zeros ($u_{01,ARE}$), ($u_{11,core}$) describe the $LP_{01}$ ARE modes and the $LP_{11}$ core mode, respectively. If further AREs have a second, smaller ARE dimension, the ratio of the second ARE dimension and the core dimension ($d_2$/D) preferably is approximated to a quotient of zeros of Bessel functions of first kind ($u_{01,ARE}/u_{21,core}$), multiplied with the fitting factor, wherein the Bessel functions ($u_{01,ARE}$), ($u_{21,core}$) describe the $LP_{01}$ ARE modes and the $LP_{21}$ core mode, respectively.

These design conditions are found on the basis of the theoretical considerations and numerical simulations illustrated in the following with reference to FIGS. 2 to 4. These theoretical considerations and numerical simulations can be correspondingly extended to the coupling of core modes higher than the $LP_{21}$ core mode to the ARE modes.

The central core region 10 of the HC-AF 100 supports several transverse core modes each with a characteristic modal refractive index and leakage loss. The inventive structure is provided in such a way that the $LP_{01}$ mode (with the highest effective index) has a loss that is much lower than any of the core HOMs. This is achieved by designing the AREs 21, 21A, 21B and the gaps between them so that they support a band of leaky modes (or states) that phase-match to HOMs in the core region 10, making them highly leaky. This strong loss discrimination can be made broadband enough for obtaining eESM behaviour.

FIG. 2A shows the HC-AF 100 of FIG. 1A (left) illustrating the fundamental $LP_{01}$ core mode (centre) and the $LP_{11}$ core mode (right) as well as the leaky ARE modes (right), to which the $LP_{11}$ core mode and higher core modes are resonantly coupled. FIG. 2B shows curves of the finite-element (FE) modelling computed effective refractive index in dependency on the parameter d/D, and FIG. 2C shows curves of leakage loss for changing ARE dimension d but constant core dimension D. The central curve in FIG. 2C shows the corresponding HOM suppression. The dashed lines show the fully vectorial computed values for the $LP_{01}$ mode of a free standing tube with diameter d and thickness t. Exemplary structure parameters are t/D=0.01 and D/λ, = 20, $n_{glass}$=1.45 and $n_{core}$=1.

The structure shown in FIG. 2A supports several leaky transverse core modes formed by anti-resonant reflection at the walls of the AREs 21 with negative curvature. The AREs 21 support a cladding photonic bandstructure provided by the inner cladding region 20, and they can be approximated by quasi free-standing, thin-walled tubes. The thick surrounding glass wall of the outer cladding region 30 does not appreciably influence the modal properties, but is provided to physically support the AREs 21.

FIG. 2B shows the effective index distribution of the two highest-index core modes $LP_{01}$ and $LP_{11}$ when varying the ARE diameter (for fixed D), effectively changing the cladding photonic bandstructure. The index of the $LP_{01}$ core mode is high enough to avoid resonant coupling to the fundamental ARE modes, and remains almost independent of d/D, whereas the $LP_{11}$ core mode undergoes a strong anti-crossing with the fundamental ARE mode at d/D 0.68. As one moves away from this anti-crossing, the even and odd eigenmodes evolve asymptotically into uncoupled $LP_{11}$ core and fundamental ARE modes. Core modes of even higher order (not shown in FIG. 2B) have lower indices and couple to highly leaky modes of the ARE ring, some of which are concentrated in the gaps between the AREs 21.

FIG. 2C plots the calculated leakage loss of the $LP_{01}$ mode and the two hybrid $LP_{11}/ARE_{01}$ modes. Over the range shown the $LP_{01}$ core mode has a relatively constant loss with a minimum value of 0.17 dB/m at d/D≈0.65. For smaller ARE 21 diameters the loss increases, closely matching the value for an isolated thick-walled dielectric capillary in the limit d/D→0 (not shown in FIG. 2C). This limit was used to cross-check the FE calculations with analytical results [16], in particular the accuracy of the perfectly matched layers (PMLs). At the anti-crossing point the loss of the two hybrid $LP_{11}/ARE_{01}$ modes strongly increases, almost reaching the value for an isolated capillary in vacuum (dashed brown line), which was calculated by solving Maxwell's equations in full vectorial form. This provides further confirmation that the PMLs were set up correctly.

The HOM suppression increases strongly at the anti-crossing, peaking at a value of about 1200. Far from the anti-crossing it drops to less than 5, which is similar to values typically achieved in Kagomé-PCF [15]. For a comprehensive analysis, the HOM suppression of all the higher-order core modes must be calculated. FE modelling reveals that the HOM with the next-lowest loss after the $LP_{11}$ core mode is the four-lobed $LP_{21}$ core mode, with a HOM suppression of ~70 at d/D≈0.68 and an anti-crossing with the fundamental ARE mode at d/D≈0.51. In experiments, however, this particular core mode is less likely to be excited by end-fire illumination or by stress- and bend-induced scattering from the $LP_{01}$ core mode (the index difference is some two times larger than for the $LP_{11}$ core mode). FE modeling shows that LPA, core modes of even higher order do not affect the overall HOM suppression because they phase-match to modes of the ARE ring (some of which are concentrated in the gaps between the AREs 21), resulting in strong leakage loss.

FIG. 3A plots, versus D/λ (λ: wavelength), the difference Amin between the refractive indices of the $LP_{lm}$ core modes and the fundamental ARE mode at constant d/D=0.68 and t/D=0.01. $\Delta n_{01}$ decreases with increasing D/λ but overall remains positive. As a consequence, the $LP_{01}$ core mode is anti-resonant with the fundamental ARE mode and remains confined to the core (see also left panel of the inset in FIG. 3A). In contrast, $\Delta n_{11}$ is much smaller, reaching values as small as $10^{-6}$ at D/λ≈66.

At certain values of D/λ anti-crossings appear between the $LP_{01}$ mode and the q-th order transverse mode in the glass walls of the AREs 21, following the simple relationship:

$$\left(\frac{D}{\lambda}\right)_q \approx \frac{q}{2(t/D)\sqrt{n_g^2-1}} \quad (1)$$

The vertical dotted lines in FIG. 3 are centred at the first two of these resonances, for t/D=0.01. In the vicinity of these points the $LP_{01}$ core mode leaks rapidly through the resonant AREs 21 into the solid glass jacket 30, yielding loss values that are close to those of an isolated thick-walled dielectric capillary [16]; the result is a strong reduction in the HOM suppression (see FIG. 3B). Away from these narrow regions, however, the HOM suppression remains relatively high—a consequence of the fact that the indices of the $LP_{11}$ core and fundamental ARE modes remain close to each other. The result is very strong $LP_{11}$ core mode suppression over all the ranges of $LP_{01}$ mode transmission.

To explain why maximum HOM suppression occurs at d/D=0.68 for all wavelengths (except in the vicinity of ARE wall resonances, see Eq. 1), the inventors have applied an analytical model in which the real structure with the core 10 and the AREs 21 are treated as thick-walled capillaries (see FIG. 4A). The modal indices of the $LP_{lm}$ modes in a thick-walled capillary can be approximated by the modified Marcatili-Schmeltzer expression [16]:

$$n_{lm} = \sqrt{1-\left(\frac{u_{lm}}{\pi f_s}\right)^2 \left(\frac{\lambda}{d_i}\right)^2} \quad (2)$$

where $u_{lm}$ is the m-th zero of the Bessel function $J_l$ and $d_i$ is the inner diameter of the capillary. The parameter $f_s$ (which has a value close to 1, s=co represents the core 10 and s=ARE the AREs 21) is used to heuristically fit the analytical values from the model equation to the results of FE simulations. It corrects for the non-circular core and the finite wall thicknesses of core 10 and AREs 21.

FIG. 4B plots the effective index of the two $LP_{11}/ARE_{01}$ hybrid modes together with the fitted values for the $LP_{11}$ mode (zero line) computed using Eq. (2) with fit parameters $f_{co}$=1.077 for the core 10 and $f_{ARE}$=0.990 for the ARE 21. The convenient analytical form of Eq. (2) allows one to derive a simple expression for the d/D value at which the $LP_{11}$ core and $ARE_{01}$ modes couple optimally:

$$\frac{d}{D} = \frac{u_{01}}{u_{11}} \frac{f_{co}}{f_{ARE}} = 0.68 \quad (3)$$

Eq. (3) provides a convenient rule-of-thumb for designing robustly single-mode eESM PCFs. To a first approximation it depends neither on the refractive indices nor on the absolute physical dimensions of the fibre, making the design scalable. This means that, provided the ratio d/D is maintained, it becomes possible to design large-core eESM PCFs and to deliver losses of some dB/km in multiple transmission windows, the broadest of which spans more than one octave.

By using Eq. (2) one can also easily find structural parameters where higher order core modes (e.g. the $LP_{21}$ core mode) are effectively suppressed. Also by adjusting the physical dimensions, the resonance bands can be blue/red shifted (for smaller/thicker wall thickness t) and the minimum transmission loss of the $LP_{01}$ core mode can be adjusted (for changing core diameter).

Eq. (2) can be also used to find appropriate geometrical parameters for designing an HC-AF with an enhanced eESM effect, i.e., a fibre where the first two HOMs of the core couple to resonances in the AREs. This yields the conditions:

$$\frac{d_1}{D} = \frac{u_{01}}{u_{11}} \frac{f_{co}}{f_{ARE}} = 0.68 \text{ and } \frac{d_2}{D} = \frac{u_{01}}{u_{21}} \frac{f_{co}}{f_{ARE}} = 0.51 \quad (4)$$

A fibre structure with such an enhanced eESM effect is depicted in FIGS. 1C to 1E consisting of one or several of single rings of AREs with different inner diameters $d_1$ and $d_2$.

Embodiments of Optical Device

The inventive HC-AF 100 has multiple applications for light guiding, e.g. for beam delivery, data transmission or frequency conversion purposes. Accordingly, an optical device, which represents a further subject of the disclosure, comprises at least one inventive HC-AF 100 and further optical components, monitoring components, detector components and/or control components, which are selected in dependency on the particular application of the optical device.

FIG. 5 schematically illustrates an optical device 200 according to an embodiment of the disclosure, which is adapted for a high power beam delivery, e.g. for surface processing purposes. The optical device 200 comprises a light source 210, like a laser source, and the HC-AF 100. The output of the light source 210 is optically coupled with an input side of the HC-AF 100, while an output side thereof is directed to a location of beam delivery (see arrow).

With alternative applications of the disclosure, the light source 210 comprises a laser source for driving a frequency conversion process, in particular a supercontinuum generation process or pulse compression, inside the HC-AF 100. According to yet further applications, the light source 210 may comprise an optical transmitter of a data communication system, which is coupled via the HC-AF 100 with an optical receiver (not shown).

It is noted that FIG. 5 represents a schematic drawing only. Details of an optical device including at least one inventive HC-AF 100 can be implemented as it is known from conventional optical devices.

Method of Manufacturing HC-AFs

FIG. 6 schematically illustrates the main steps of manufacturing an inventive HC-AF 100. FIG. 6 is a schematic illustration only, which presents the main steps of providing ARE preforms 23 and a hollow jacket preform 32 (FIG. 6A), fixing the ARE preforms 23 on an inner surface of the jacket preform 32 (FIG. 6B) and heating and drawing the preform jacket 32 including the ARE preforms 23 for obtaining the HC-AF 100 (FIG. 6C). Optionally, the heating and drawing step may include a first step of heating and drawing the jacket preform 32 with the ARE preforms 23 to a cane, and a second step of heating and drawing the cane until the ARE and core dimensions are set. Details of the steps in FIGS. 6A, 6B, and 6C can be implemented as far as they are known from conventional fibre manufacturing methods.

According to FIG. 6A, the jacket preform 32 is a hollow tubular form, made of glass, which has an inner transverse cross-sectional regular hexagonal shape. The outer diameter of the preform jacket 32 is e.g. 28 mm, while the inner transverse dimension is about 22 mm. The longitudinal length of the preform jackets 32 and the ARE preforms 23 is about 120 cm.

With the fixing step of FIG. 6B, the ARE preforms 23 are fixed to the corners of the inner hexagonal shape of the jacket preform 32. This is obtained by applying heat resulting in a physical connection between ARE preforms and jacket preform. Subsequently, the composite of the jacket preform 32 and the ARE preforms 23 is drawn during the application of heat until the ARE and core transverse dimensions are obtained. The ARE and core transverse dimensions can be influenced by applying a vacuum or an increased pressure to the jacket preform 32 and/or the ARE preforms 23 during the heating and drawing steps.

Applying a vacuum or an increased pressure during the heating and drawing steps is schematically illustrated in FIG. 6B. The hollow inner space of the jacket preform 32 is connected with a first external reservoir 41, like a source of pressurized nitrogen. Furthermore, the ARE preforms 23 are connected with at least one second external reservoir 42, like e.g. an external source of pressurized nitrogen. If all AREs are to be produced with the same inner transverse dimension, all AREs can be connected with a common external reservoir. Otherwise, e.g. two groups of AREs are connected to two different external reservoirs for creating different inner transverse dimensions, as shown e.g. in FIG. 1E. The final heating and drawing step is conducted e.g. in a furnace selected in dependency of the material of the jacket preform 32 and the ARE preforms 23 (e.g. around 2000° C. for silica components).

After obtaining the final HC-AF 100, it can be filled with, a gas, like air or a noble gas or hydrogen, or a liquid, like water, and the input and output sides of the HC-AF 100 are enclosed by a cell withstanding high fluidic pressure and which is partially transmissive, e.g. by including a glass plate, for optical radiation, e.g. from a laser source.

Further embodiments according to the disclosure are described below in numbered clauses:

1. Hollow-core fibre (100) of non-bandgap type, comprising:
   a hollow core region (10) axially extending along the hollow-core fibre (100) and having a smallest transverse core dimension (D), wherein the core region (10) is adapted for guiding a transverse fundamental core mode and transverse higher order core modes, and
   an inner cladding region (20) comprising an arrangement of anti-resonant elements (AREs) (21, 21A, 21B) surrounding the core region (10) along the hollow-core fibre (100), each having a smallest transverse ARE dimension ($d_1$) and being adapted for guiding transverse ARE modes,
   characterized in that
   the core region (10) and the AREs (21, 21A, 21B) are configured to provide phase matching of the higher order core modes and the ARE modes, and
   the ARE dimension ($d_i$) and the core dimension (D) are selected such that a ratio of the ARE and core dimensions ($d_i/D$) is approximated to a quotient of zeros of Bessel functions of first kind ($u_{lm,ARE}/u_{lm,core}$), multiplied with a fitting factor in a range from 0.9 to 1.5, with m being the m-th zero of the Bessel functions of first kind of order 1, said zeros of the Bessel functions describing the $LP_{lm}$ ARE modes and $LP_{lm}$ higher order core modes, respectively.

2. Hollow-core fibre according to clause 1, wherein the AREs surrounding the core region are arranged in a non-touching manner.

3. Hollow-core fibre according to one of the foregoing clauses, wherein
   the AREs (21, 21A) have a first smallest transverse ARE dimension ($d_1$), and
   the ratio of the first ARE dimension and the core dimension ($d_1/D$) is approximated to a quotient of zeros of Bessel functions of first kind ($u_{01,ARE}/u_{11,core}$), multiplied with the fitting factor, said zeros ($u_{01,ARE}$), ($u_{11,core}$) describing the $LP_{01}$ ARE modes and the $LP_{11}$ core mode, respectively.

4. Hollow-core fibre according to clause 3, wherein the ratio of the first ARE dimension and the core dimension ($d_1/D$) is selected in a range from 0.5 to 0.8.

5. Hollow-core fibre according to clause 4, wherein the ratio of the first ARE dimension and the core dimension ($d_1/D$) is selected in a range from 0.62 to 0.74.

6. Hollow-core fibre according to one of the clauses 3 to 5, wherein each of the AREs (21) has the first ARE dimension ($d_1$).

7. Hollow-core fibre according to one of the clauses 3 to 5, wherein
a first group of the AREs (21A) has the first ARE dimension ($d_1$), and
a second group of the AREs (21B) has a second smallest transverse ARE dimension ($d_2$) smaller than the first ARE dimension ($d_1$) of the first group of the AREs (21A), and
the ratio of the second ARE dimension and the core dimension ($d_2/D$) is approximated to a quotient of zeros of Bessel functions of first kind ($u_{01,ARE}/u_{21,core}$), multiplied with the fitting factor, said Bessel functions ($u_{01,ARE}$), ($u_{21,core}$) describing the $LP_{01}$ ARE modes and the $LP_{21}$ core mode, respectively.

8. Hollow-core fibre according to clause 7, wherein the ratio of the second ARE dimension and the core dimension ($d_2/D$) is selected in a range from 0.3 to 0.7.

9. Hollow-core fibre according to clause 7, wherein the ratio of the second ARE dimension and the core dimension ($d_2/D$) is selected in a range from 0.45 to 0.54.

10. Hollow-core fibre according to one of the foregoing clauses, wherein the number of AREs (21, 21A, 21B) is 3, 4, 5, 6 or 7.

11. Hollow-core fibre according to one of the foregoing clauses, wherein the arrangement of AREs (21, 21A, 21B) has at least one of the features:
the arrangement of AREs (21, 21A, 21B) has three-fold symmetry,
the arrangement of AREs (21, 21A, 21B) has two-fold symmetry and causes optical birefringence,
the AREs (21, 21A, 21B) are arranged such that the cross-sections thereof are distributed on a single ring surrounding the core region (10), and
the AREs (21, 21A, 21B) are arranged such that the cross-sections thereof are distributed on multiple rings surrounding the core region (10).

12. Hollow-core fibre according to one of the foregoing clauses, wherein the AREs (21, 21A, 21B) have at least one of the features:
the AREs (21, 21A, 21B) have a circular, elliptic or polygonal transverse cross-section, and
the AREs (21, 21A, 21B) are made of a glass, in particular silica or ZBLAN, polymer, in particular PMMA, composite, metal or crystalline material.

13. Hollow-core fibre according to one of the foregoing clauses, wherein
at least one of the core region (10) and the AREs (21, 21A, 21B) is evacuated or filled with at least one of a gas, in particular at least one of air or noble gas or hydrogen, a liquid, and a material having a non-linear optical response.

14. Hollow-core fibre according to one of the foregoing clauses, comprising
an outer cladding region (30) surrounding the inner cladding region (20) along the hollow-core fibre (100), wherein
the outer cladding region (30) has a transverse cross-section with a polygonal shape, and the AREs (21, 21A, 21B) are located in corners of the polygonal shape.

15. Hollow-core fibre according to one of the clauses 1 to 13, comprising
an outer cladding region (30) surrounding the inner cladding region (20) along the hollow-core fibre (100), wherein
the outer cladding region (30) has a transverse cross-section with a curved, in particular circular shape, and
the AREs (21, 21A, 21B) are evenly distributed in the curved shape.

16. Hollow-core fibre according to one of the foregoing clauses, wherein
the core region (10) and the AREs (21, 21A, 21B) are configured to provide the phase matching of the higher order core modes and the ARE modes in a broadband wavelength range.

17. Hollow-core fibre according to clause 16, wherein
the core region (10) and the AREs (21, 21A, 21B) are configured to provide the phase matching of the higher order core modes and the ARE modes in a wavelength range covering up to all wavelengths within a hollow-core fibre transparency window of the fundamental core mode.

18. Hollow-core fibre according to clause 16 or 17, wherein
the core region (10) and the AREs (21, 21A, 21B) are configured to provide the phase matching of the higher order core modes and the ARE modes in a wavelength range covering at least 10 THz.

19. Optical device (200), including at least one hollow-core fibre (100) according to one of the foregoing clauses.

20. Optical device according to clause 19, comprising at least one of
a modal filtering device,
a light source (210), in particular a laser,
an optical amplifier,
a beam delivery system,
a pulse shaper, in particular for pulse compression,
a data communication system, and
a frequency converter, in particular for supercontinuum generation.

21. Method of manufacturing a hollow-core fibre (100) of non-bandgap type, comprising the steps of:
providing a hollow core region (10) axially extending along the hollow-core fibre (100) and having a smallest transverse core dimension (D), wherein the core region (10) is adapted for guiding a transverse fundamental core mode and transverse higher order core modes, and
providing an inner cladding region (20) comprising an arrangement of anti-resonant elements (AREs) (21, 21A, 21B) surrounding the core region (10) along the hollow-core fibre (100), each having a smallest transverse ARE dimension ($d_i$) and being adapted for guiding transverse ARE modes, wherein
the core region (10) and the AREs (21, 21A, 21B) are configured to provide phase matching of the higher order core modes and the ARE modes,
characterized in that
the ARE dimension ($d_i$) and the core dimension (D) are selected such that a ratio of the ARE and core dimensions ($d_i/D$) is approximated to a quotient of zeros of Bessel functions of first kind ($u_{lm,ARE}/u_{lm,core}$), multiplied with a fitting factor in a range from 0.9 to 1.5, with m being the m-th zero of the Bessel functions of first kind of order 1, said zeros of the Bessel functions describing the $LP_{lm}$ ARE modes and $LP_{lm}$ higher order core modes, respectively.

22. Method according to clause 21, wherein
the hollow-core fibre (100) is manufactured with the features of the hollow-core fibre (100) according to one of the clauses 1 to 17.

23. Method according to clause 21 or 22, wherein
the ARE dimension ($d_i$) is selected by applying an analytical model in which the core (10) and the AREs (21, 21A, 21B) are treated as capillaries, wherein modal indices of the $LP_{lm}$ modes in the capillaries are approximated by $$n_{lm} = \sqrt{1 - \left(\frac{u_{lm}}{\pi f_s}\right)^2 \left(\frac{\lambda}{d_i}\right)^2}$$

wherein $u_{lm}$ is the m-th zero of the Bessel function $J_1$, $d_i$ this the inner diameter of the capillary, and the parameter $f_s$ is a heuristic fit parameter.

24. Method according to one of the clauses 21 to 23, comprising the steps of
(a) providing ARE preforms (23) and a hollow jacket preform (32),
(b) fixing the ARE preforms (23) on an inner surface of the jacket preform (32) in a distributed manner,
(c) heating and drawing the jacket preform (32) including the ARE preforms (23) until the ARE and core dimensions are set.

25. Method according to clause 24, wherein step (c) includes
(c1) heating and drawing the jacket preform (32) including the ARE preforms (23) to a cane, and
(c2) heating and drawing the cane until the ARE and core dimensions are set.

26. Method according to clause 25, wherein step (c) includes
applying a vacuum or an increased pressure to at least one of the jacket preform (32) and the ARE preforms (23) or hollow regions of the cane for setting the ARE and core dimensions.

27. Method according to one of clauses 25 or 26, comprising a post-processing step of
filling at least one of the core region (10) and the AREs (21, 21A, 21B) with at least one of a gas, in particular air or noble gas or hydrogen, a liquid, and a material having a non-linear optical response.

The features of the disclosure disclosed in the above description, the drawings and the claims can be of significance individually, in combination or sub-combination for the implementation of the disclosure in its different embodiments.

While specific embodiments of the invention have been described above, it will be appreciated that the invention may be practiced otherwise than as described. The description is not intended to limit the invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments, but should be defined only in accordance with the following claims and their equivalents.

What is claimed is:

1. A hollow-core anti-resonant-reflecting fibre (HC-AF) comprising:
a hollow-core region axially extending along the HC-AF, wherein the hollow-core region comprises a first transverse cross-sectional dimension (D);
an inner cladding region comprising a plurality of anti-resonant elements (AREs) and surrounding the hollow-core region, wherein at least one of the plurality of AREs comprises a second transverse cross-sectional dimension (d); and
an outer cladding region surrounding the inner cladding region,
wherein the plurality of AREs comprises non-nested AREs,
wherein a ratio of the first and second transverse cross-sectional dimensions (d/D) is configured to provide phase matching of higher order hollow-core modes and ARE modes,
wherein the ratio of the first and second transverse cross-sectional dimensions (d/D) is in a range from 0.45 to 0.8, and
wherein the ratio of the first and second transverse cross-sectional dimensions (d/D) is based on one or more Bessel functions.

2. The HC-AF of claim 1, wherein the ratio of the first and second transverse cross-sectional dimensions (d/D) is in a range from 0.6 to 0.75.

3. The HC-AF of claim 1, wherein the ratio of the first and second transverse cross-sectional dimensions (d/D) is in a range from 0.62 to 0.74.

4. The HC-AF of claim 1, wherein the first transverse cross-sectional dimension (D) is in a range from 10 μm to 1000 μm.

5. The HC-AF of claim 1, wherein the second transverse cross-sectional dimension (d) is in a range from 5 μm to 800 μm.

6. The HC-AF of claim 1, wherein:
at least one of the plurality of AREs comprises a third transverse cross-sectional dimension ($d_2$), and
the second transverse cross-sectional dimension (d) and the third transverse cross-sectional dimension ($d_2$) are different.

7. The HC-AF of claim 6, wherein:
a ratio of the first and third transverse cross-sectional dimensions ($d_2$/D) is configured to provide phase matching of higher order hollow-core modes and ARE modes, and wherein the ratio of the first and third transverse cross-sectional dimensions ($d_2/D$) is in a range from 0.3 to 0.7.

8. The HC-AF of claim 7, wherein the ratio of the first and third transverse cross-sectional dimensions ($d_2/D$) is in a range from 0.43 to 0.59.

9. The HC-AF of claim 1, wherein:
at least one of the plurality of AREs comprises a wall thickness (t), and
a ratio of the wall thickness and the first transverse cross-sectional dimension (t/D) is no greater than 0.2.

10. The HC-AF of claim 9, wherein the wall thickness (t) is no greater than 5 µm.

11. The HC-AF of claim 1, wherein a ratio of the first transverse cross-sectional dimension and a wavelength (λ) of the HC-AF (D/λ) is in a range from 20 to 130.

12. The HC-AF of claim 1, wherein a ratio of the first transverse cross-sectional dimension and a wavelength (λ) of the HC-AF (D/λ) and a ratio of a wall thickness (t) of the plurality of AREs and the first transverse cross-sectional dimension (t/D) are related by $$\left(\frac{D}{\lambda}\right)_q \approx \frac{q}{2(t/D)\sqrt{n_g^2 - 1}}$$

where q is the q-th order transverse mode of the ARE modes and ng is the index of refraction of the plurality of AREs.

13. The HC-AF of claim 1, wherein the phase matching of higher order hollow-core modes and ARE modes is in a broadband wavelength range.

14. The HC-AF of claim 13, wherein the phase matching of higher order hollow-core modes and ARE modes is obtained over a frequency range above at least 10 THz.

15. An optical device comprising:
a hollow-core anti-resonant-reflecting fibre (HC-AF), the HC-AF comprising:
a hollow-core region axially extending along the HC-AF, wherein the hollow-core region comprises a first transverse cross-sectional dimension (D);
an inner cladding region comprising a plurality of anti-resonant elements (AREs) and surrounding the hollow-core region, wherein at least one of the plurality of AREs comprises a second transverse cross-sectional dimension (d); and
an outer cladding region surrounding the inner cladding region,
wherein the plurality of AREs comprises non-nested AREs,
wherein a ratio of the first and second transverse cross-sectional dimensions (d/D) is configured to provide phase matching of higher order hollow-core modes and ARE modes,
wherein the ratio of the first and second transverse cross-sectional dimensions (d/D) is in a range from 0.45 to 0.8, and
wherein the ratio of the first and second transverse cross-sectional dimensions (d/D) is based on one or more Bessel functions.

16. The optical device of claim 15, comprising at least one of:
a modal filtering device;
a light source;
an optical amplifier;
a beam delivery system;
a pulse shaper;
a data communication system; or
a frequency converter.

17. A method of manufacturing a hollow-core anti-resonant-reflecting fibre (HC-AF), the method comprising:
providing a hollow-core region axially extending along the HC-AF, wherein the hollow-core region comprises a first transverse cross-sectional dimension (D);
providing an inner cladding region comprising a plurality of anti-resonant elements (AREs), wherein at least one of the plurality of AREs comprises a second transverse cross-sectional dimension (d); and
coupling the plurality of AREs to an inner surface of an outer cladding region surrounding the inner cladding region,
wherein the plurality of AREs comprises non-nested AREs,
wherein a ratio of the first and second transverse cross-sectional dimensions (d/D) is configured to provide phase matching of higher order hollow-core modes and ARE modes,
wherein the ratio of the first and second transverse cross-sectional dimensions (d/D) is in a range from 0.45 to 0.8, and
wherein the ratio of the first and second transverse cross-sectional dimensions (d/D) is based on one or more Bessel functions.

18. The method of claim 17, further comprising providing at least one of the plurality of AREs with a wall thickness (t), wherein a ratio of the wall thickness and the first transverse cross-sectional dimension (t/D) is no greater than 0.2.

19. The method of claim 17, further comprising filling the HC-AF with a gas, a liquid, or a material having a non-linear optical response.

* * * * *

UNITED STATES PATENT AND TRADEMARK OFFICE
CERTIFICATE OF CORRECTION

PATENT NO. : 12,242,105 B2
APPLICATION NO. : 18/216051
DATED : March 4, 2025
INVENTOR(S) : Russell et al.

It is certified that error appears in the above-identified patent and that said Letters Patent is hereby corrected as shown below:

In the Specification

In Column 1, Line 8, delete "2022," and insert -- 2022 (now U.S. Pat. No. 11,733,451, issued Aug. 22, 2023), --, therefor.

In Column 2, Line 39, delete "(HC-AF s)." and insert -- (HC-AFs). --, therefor.

In Column 3, Line 39, delete "e. g." and insert -- e.g. --, therefor.

In Column 4, Line 51, delete "(LPN)" and insert -- $(LP_{lm})$ --, therefor.

In Column 4, Line 52, delete "(LPN)" and insert -- $(LP_{lm})$ --, therefor.

In Column 5, Line 61, delete "D/λ," and insert -- D/λ --, therefor.

In Column 7, Line 18, delete "e. g." and insert -- e.g. --, therefor.

In Column 7, Line 24, delete "e. g." and insert -- e.g. --, therefor.

In Column 7, Line 26, delete "e. g." and insert -- e.g. --, therefor.

In Column 7, Line 27, delete "e. g." and insert -- e.g. --, therefor.

In Column 7, Line 56, delete "i. e." and insert -- i.e. --, therefor.

In Column 9, Line 40, delete "e. g." and insert -- e.g. --, therefor.

In Column 11, Line 23, delete "D=20" and insert -- D=20 μm. --, therefor.

In Column 12, Line 51, delete "D/λ," and insert -- D/λ --, therefor.

Signed and Sealed this
Eighth Day of April, 2025

Coke Morgan Stewart
*Acting Director of the United States Patent and Trademark Office*

CERTIFICATE OF CORRECTION (continued)
U.S. Pat. No. 12,242,105 B2

In Column 12, Line 56, delete "bandstructure" and insert -- band structure --, therefor.

In Column 12, Line 65, delete "bandstructure." and insert -- band structure. --, therefor.

In Column 13, Line 2, delete "d/D 0.68." and insert -- d/D≈0.68. --, therefor.

In Column 13, Line 38, delete "LPA," and insert -- $LP_{lm}$ --, therefor.

In Column 13, Line 44, delete "Amin" and insert -- $\Delta n_{lm}$ --, therefor.

In Column 13, Line 52, delete "D/λ" and insert -- D/λ, --, therefor.

In Column 14, Line 21, delete "$J_I$" and insert -- $J_l$ --, therefor.

In Column 16, Line 37, delete "$(d_1)$" and insert -- $(d_i)$ --, therefor.

In Column 16, Line 49, delete "order 1," and insert -- order l, --, therefor.

In Column 19, Lines 17-18, delete "$d_i$ this the inner" and insert -- $d_i$ is the inner --, therefor.